(12) United States Patent
Zhang et al.

(10) Patent No.: US 12,516,990 B1
(45) Date of Patent: Jan. 6, 2026

(54) INDOOR FIRE SOURCE LOCALIZATION METHOD FOR HIGH-RISE BUILDINGS BASED ON GLASS SURFACE TEMPERATURE

(71) Applicant: Shenzhen Research Institute of China University of Mining and Technology, Guangdong (CN)

(72) Inventors: Guowei Zhang, Shenzhen (CN); Shiyong Zhang, Shenzhen (CN); Zhiwei Zhang, Shenzhen (CN); Zhihan Li, Shenzhen (CN); Chunyuan Liu, Shenzhen (CN)

(73) Assignee: Shenzhen Research Institute of China University of Mining and Technology, Shenzhen (CN)

( * ) Notice: Subject to any disclaimer, the term of this patent is extended or adjusted under 35 U.S.C. 154(b) by 0 days.

(21) Appl. No.: 19/294,193

(22) Filed: Aug. 7, 2025

(30) Foreign Application Priority Data

Aug. 9, 2024 (CN) .......................... 202411091990.4

(51) Int. Cl.
*G01K 3/14* (2006.01)
(52) U.S. Cl.
CPC ......... *G01K 3/14* (2013.01); *G01K 2003/145* (2013.01)

(58) Field of Classification Search
CPC ........................... G01K 3/14; G01K 2003/145
USPC ......................................................... 702/130
See application file for complete search history.

(56) References Cited

PUBLICATIONS

Tang et al., CN 106875822 B, "A Building Outer Vertical Fire Simulation Device", Date published: Apr. 5, 2019 (Year: 2019).*

* cited by examiner

*Primary Examiner* — John H Le
(74) *Attorney, Agent, or Firm* — Reising Ethington, P.C.

(57) ABSTRACT

Provided is an indoor fire source localization method for high-rise buildings based on glass surface temperature, including the following steps: arranging an array of m wireless thermocouples on an outer surface of glass; measuring horizontal distances from a centrally positioned wireless thermocouple in the arranged array of wireless thermocouples to both side walls of a fire room; acquiring temperature data signals at preset time intervals t and transmitting the acquired temperature data to a data processing terminal for averaging; using averaged real-time glass temperature data and the horizontal distances from the centrally positioned wireless thermocouple to the two side walls as input data to form an input dataset, and feeding the dataset into a trained prediction program integrating a multilayer perceptron (MLP) and a k-nearest neighbors (KNN) algorithm; and determining a predicted fire source location block through backpropagation and category voting.

5 Claims, 4 Drawing Sheets

Arrange an array of m wireless thermocouples on an outer surface of glass in a fire room, and measure horizontal distances from a centrally positioned wireless thermocouple in the arranged array to two side walls of a fire room Save acquired temperature data at preset time intervals t, and transmit the temperature data to a data processing terminal for averaging Use averaged real-time temperature data of the glass and the horizontal distances from the centrally positioned wireless thermocouple to the two side walls as input data to form a dataset Input the dataset to a trained prediction program integrating an MLP and a KNN algorithm, and obtain a predicted location block of a fire source through backpropagation and category voting

Train an MLP model using an MLPClassifier, and obtain category probabilities of a training set and a test set using a predict_proba method Horizontally stack MLP-outputted category probabilities with raw data features using an np.hstack function to form a new feature matrix Train a KNN model using a KNeighborsClassifier, with the new feature matrix as input Output training results and accuracy

INDOOR FIRE SOURCE LOCALIZATION METHOD FOR HIGH-RISE BUILDINGS BASED ON GLASS SURFACE TEMPERATURE

CROSS REFERENCE TO RELATED APPLICATION

This patent application claims the benefit and priority of Chinese Patent Application No. 202411091990.4, filed with the China National Intellectual Property Administration on Aug. 9, 2024, the disclosure of which is incorporated by reference herein in its entirety as part of the present application.

TECHNICAL FIELD

The present disclosure relates to an indoor fire source localization method for high-rise buildings based on glass surface temperature, belonging to the technical field of fire source localization.

BACKGROUND

With the accelerated pace of urbanization, the original architectural forms can no longer meet the living and working environment demands of urban populations, leading to a gradual increase in building heights. High-rise buildings contain numerous vertical shafts such as pipe shafts, cable shafts, and smoke exhaust ducts. In the event of a fire, these shafts provide additional pathways for vertical fire spread in high-rise buildings, accelerating smoke propagation. During firefighting and rescue operations in high-rise buildings, external firefighting measures are often required. However, the water spray height of existing fire trucks cannot meet the needs of high-rise building fire rescue, making it difficult for firefighters to promptly extinguish fires in high-rise buildings. Accurately locating indoor fire sources in high-rise buildings can significantly improve firefighting efficiency and reduce casualties and property losses caused by fires.

Currently, room fire source localization technologies mainly include visual fire localization, wireless sensor network localization, and optical fiber sensor localization. These localization technologies all rely on fixed-position sensors, which need to be installed during construction of the building. Such fixed deployments lack flexibility and are highly likely to fail during a fire. Additionally, these localization technologies involve high time costs, making them unable to meet the real-time requirements of practical applications.

SUMMARY

The present disclosure provides an indoor fire source localization method for high-rise buildings based on glass surface temperature. The location method offers high deployment flexibility, strong real-time performance, and reliability, making it adaptable to a wide range of practical scenarios.

To achieve the above objective, the present disclosure provides an indoor fire source localization method for high-rise buildings based on glass surface temperature, including the following steps:

step 1: arranging an array of m wireless thermocouples on an outer surface of glass in a fire room, with the array distributed on a largest piece of glass in the fire room, where each wireless thermocouple is connected to a temperature data signal acquisition module;

step 2: measuring horizontal distances from a centrally positioned wireless thermocouple in the arranged array to two side walls of the fire room, denoted as $D_1$ and $D_2$;

step 3: dividing the fire room into r blocks of an equal area, where the quantity of blocks is the same as the quantity of wireless thermocouples, and the blocks are arranged in an array, assigning numbers to the blocks, and using the numbers of the blocks as program-output fire source location categories;

step 4: adjusting the temperature data signal acquisition module to receive temperature data signals from each wireless thermocouple at a frequency q;

step 5: activating a fire source in the fire room and the temperature data signal acquisition module, acquiring and reading temperature data from each wireless thermocouple in real time, saving the acquired temperature data at preset time intervals t, and transmitting the temperature data to a data processing terminal;

step 6: after receiving the temperature data, averaging, by the data processing terminal, the temperature data acquired by each wireless thermocouple over each preset time interval t, to obtain m pieces of average temperature data;

step 7: combining, by the data processing terminal, the obtained m pieces of average temperature data into a 1×m matrix and adding distance data $D_1$ and $D_2$ to the matrix, resulting in a 1×(m+2) matrix;

step 8: inputting the 1×(m+2) matrix obtained in step 7 into a trained prediction program integrating a multi-layer perceptron (MLP) and a k-nearest neighbors (KNN) algorithm, and obtaining a predicted location block of the fire source through backpropagation and category voting.

Further, the temperature data in step 6 is obtained specifically according to the following steps of:

(1) receiving, by the data processing terminal, the temperature data, and obtaining a matrix as follows:

$$\begin{pmatrix} T_{11}, T_{12}, T_{13} \ldots T_{1(tq)} \\ T_{21}, T_{22}, T_{23} \ldots T_{2(tq)} \\ \ldots\ldots \\ T_{m1}, T_{m2}, T_{m3} \ldots T_{m(tq)} \end{pmatrix};$$

where $T_{m(tg)}$ represents a tq-th data acquired by an m-th wireless thermocouple within the time interval t; and a total of tq pieces of temperature data are acquired from a single wireless thermocouple within the time interval t; and (2) calculating an average value of each row of temperature data in the matrix from step (1) to form a row matrix:

$[T_1=(T_{11}+T_{12}+\ldots T_{1(tq)})/tq, T_2=(T_{21}+T_{22}+\ldots T_{2(tq)}/tq, \ldots, T_m=T_{11}+T_{12}+\ldots T_{1(tq)}/tq]$ where $T_m$ is an average temperature data value of the m-th wireless thermocouple within the time interval t.

Further, a specific process of step 7 is as follows: adding $D_1$ and $D_2$ to the row matrix obtained in step 6 to form a new matrix:

$[T_1, T_2, T_3, \ldots, T_m, D_1, D_2]$.

Further, a training process of the prediction program integrating the MLP and KNN algorithm in step 8 is as follows:

(1) simulating fire data using fire simulation software, and constructing a fire dataset, with a specific process as follows:
a. establishing a fire combustion model, and setting parameters comprising room geometry, fire source location, fire source heat release rate, and fire source area;
b. arranging m temperature measurement points in an equally spaced square array on fire room glass, recording temperature at each temperature measurement point, and noting distances $D_1$ and $D_2$ from the central wireless thermocouple to two side walls;
c. setting a simulation time to obtain a post-simulation measurement point temperature dataset $\{T_{mt}\}$, where $T_{mt}$ represents temperature data of an m-th measurement point at a t-th second;
d. packaging temperature measurement point data into a dataset, wherein a vertical dimension represents different times, and a horizontal dimension represents temperature parameters and distance parameters of different wireless thermocouples:

$$\begin{Bmatrix} T_{11}, T_{21}, \ldots, T_{m1}, D_1, D_2 \\ T_{12}, T_{22}, \ldots, T_{m2} \\ \ldots\ldots \\ T_{1t}, T_{2t}, T_{m3}, \ldots, T_{mt} \end{Bmatrix};$$

(2) dividing the dataset into a training set and a test set using train_test_split;
(3) creating an MLP model, configuring a structure of each hidden layer, and setting an activation function ReLU and a maximum number of iterations, where a specific process is as follows: setting input feature dimensionality based on experimental data parameters, that is, the quantity of temperature measurement points and the quantity of distance parameters; configuring the structure of each hidden layer based on the input feature dimensionality, and setting the activation function ReLU and the maximum number of iterations;
(4) calling a fit method to train the MLP model, optimizing weights and biases of a network to minimize a loss function, with steps as follows:
a. inputting a training dataset and initializing parameters, comprising weights and biases;
b. passing input data to each neuron in an input layer;
c. in the hidden layer, multiplying the input data by a weight matrix of the current layer and adding a bias term;
d. applying the activation function ReLU to a weighted sum for nonlinear transformation to obtain an output of the hidden layer:

$H=\sigma(XW_h+b_h)$ $\hat{p}=\text{soft max}(XW_h+b_h)$ where H represents the hidden layer, $\sigma$ represents the activation function, X represents the input layer, $W_h$ represents the weight, $b_h$ represents the bias term, $\hat{p}$ represents an MLP probability result, and a softmax function is used to convert the output into a probability distribution;
e. in an output layer, multiplying an output of a last hidden layer by a weight matrix of the output layer and adding a bias term;
f. computing a final predicted output using the Softmax function;
g. calculating an error (loss value) between model-predicted values and actual labels;
h. computing gradients of the loss function with respect to the weights and biases using a chain rule;
i. updating the parameters of the network using the computed gradients;
j. inputting a validation dataset to obtain a loss value;
k. repeating steps b to j until the loss value of the validation dataset no longer decreases or a preset number of training iterations is reached;
(5) reading output probabilities of the MLP model using a predict_proba method, where the output probabilities represent predicted probabilities for each fire source location category;
(6) creating a KNN classifier and setting the quantity of neighbors k;
(7) training the KNN classifier using features extracted from the MLP model;
(8) calling the fit method to train a KNN model, specifically including storing training data and training labels, where in the fit method, the KNN model does not modify or learn data; it simply save the data within the model;
(9) predicting test data using a predict method, with steps as follows:
a. for each input test sample, computing a Euclidean distance of the test sample to all training samples:

$$\sqrt{\sum_{i=1}^{n}(x_i-y_i)^2}$$

where n represents dimensionality; xi represents a training sample, and $y_i$ represents a test sample;
b. selecting k nearest training samples based on the distances obtained in step a;
c. performing voting or weighted voting on labels of the selected k neighbors to determine a final predicted fire source location category for the test sample:

$$\hat{y}=\text{argmax}_c\left(\sum_{i=1}^{r}\prod(y_i=c)\right)$$

where $\hat{y}$ represents a predicted result; $\Pi(y_i=c)$ is an indicator function that equals 1 if a category $y_i$ of an i-th neighbor is c; otherwise, the indicator function equals 0;
(10) computing classification accuracy using a classification_report function, with a formula as follows:

$$\text{Accuracy}=\frac{n_{correct}}{n_{total}}$$

where Accuracy represents accuracy; $n_{correct}$ represents the quantity of correctly predicted test sets, and $n_{total}$ represents a total quantity of test sets;
(11) incrementally increasing a k value of the KNN classifier until the accuracy no longer improves; and
(12) completing the training and saving all parameters of the MLP model and the KNN model.

Further, the preset time interval t ranges from 10 to 60 seconds, and the frequency q is 1 Hz or higher. The specific frequency is determined based on the time interval t, ensuring at least one piece of temperature data point is acquired within each time interval t.

In the present disclosure, glass temperature data in a fire room is acquired through wireless thermocouples. By leveraging temperature differential calculations from multiple wireless thermocouples and employing a classification model that integrates an MLP and a KNN algorithm, it effectively handles nonlinear relationships to achieve accurate fire source localization. Furthermore, the present disclosure is applicable to building fires of any type, free from constraints of existing fire protection systems or installation requirements. It enables on-demand fire source localization for firefighting operations with high deployment flexibility, real-time reliability, and adaptability to diverse practical scenarios, demonstrating strong universality and instantaneous response capabilities.

DETAILED DESCRIPTION OF THE EMBODIMENTS

The present disclosure will be further described below with reference to the accompanying drawings.

Figure 1:
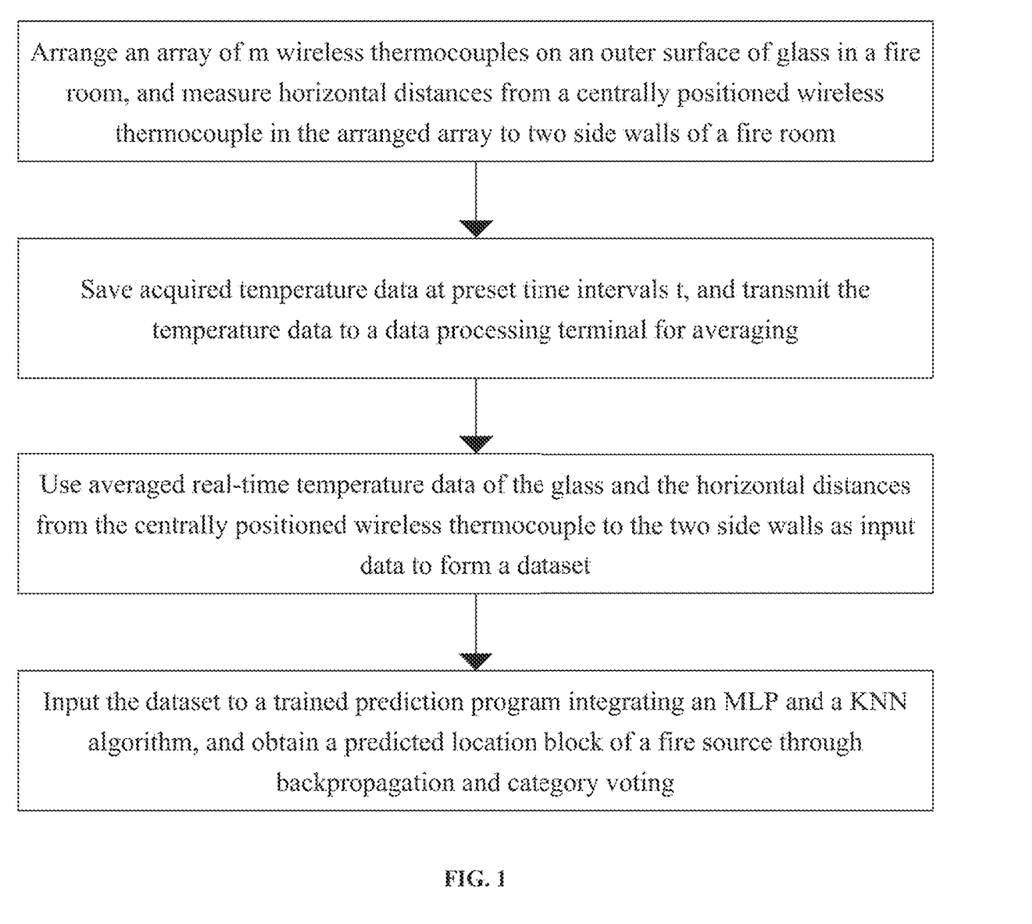
FIG. 1 is a flowchart of the present disclosure.

As shown in FIG. 1, an indoor fire source localization method for high-rise buildings based on glass surface temperature includes the following steps:

Step 1: Arrange an array of m wireless thermocouples on an outer surface of glass in a fire room, with the array distributed on a largest piece of glass in the fire room, where each wireless thermocouple is connected to a temperature data signal acquisition module.

Figure 2:
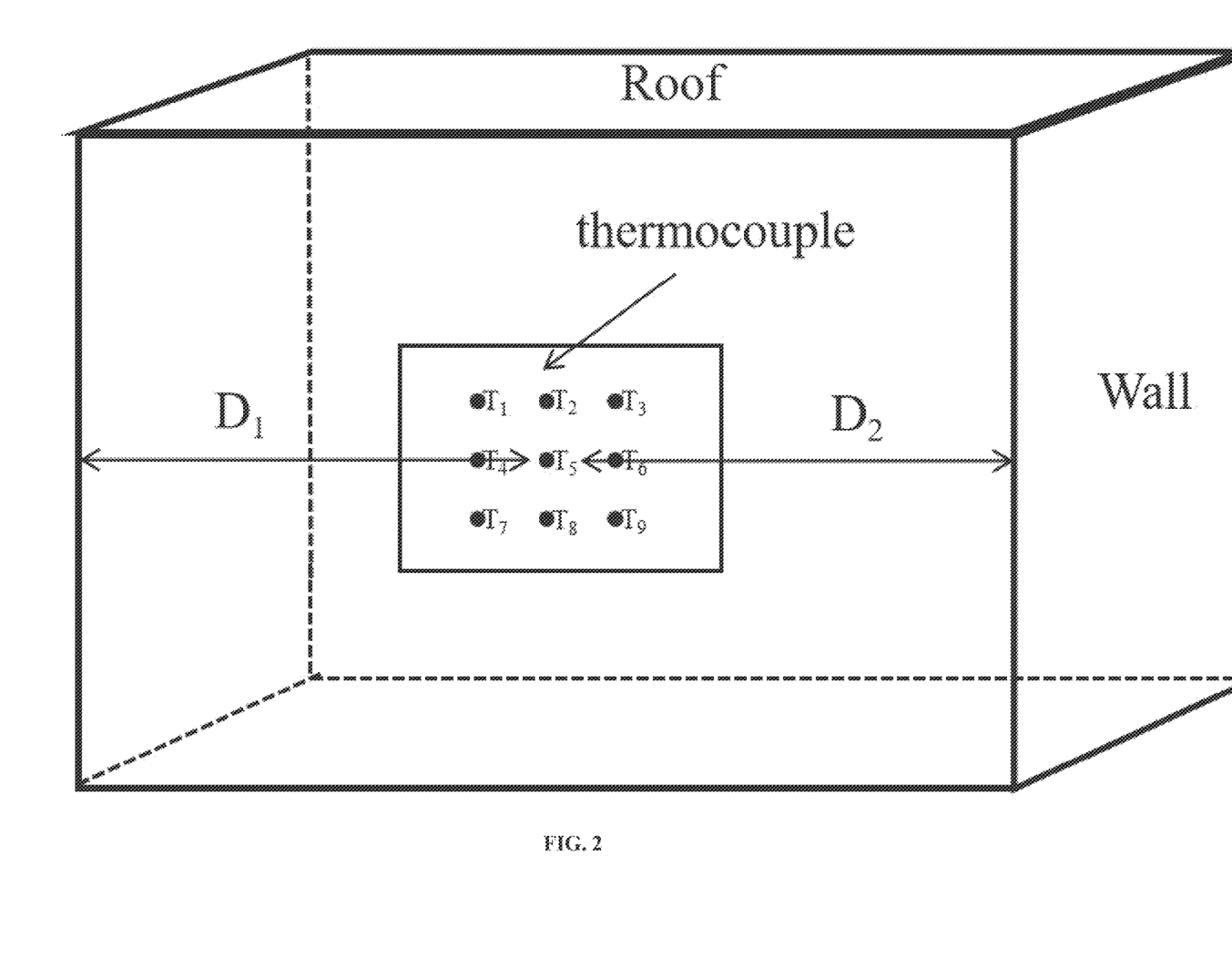
FIG. 2 is a schematic diagram illustrating horizontal distances between a central wireless thermocouple and two side walls of a fire room according to the present disclosure.

Step 2: As shown in FIG. 2, measure horizontal distances from a centrally positioned wireless thermocouple in the arranged array to two side walls of the fire room, denoted as $D_1$ and $D_2$.

Step 3: Divide the fire room into r blocks of an equal area, where the quantity of blocks is the same as the quantity of wireless thermocouples, and the blocks are arranged in an array, assign numbers to the blocks, and use the numbers of the blocks as program-output fire source location categories.

Step 4: Adjust the temperature data signal acquisition module to receive temperature data signals from each wireless thermocouple at a frequency q.

Step 5: Activate a fire source in the fire room and the temperature data signal acquisition module, acquire and read temperature data from each wireless thermocouple in real time, save the acquired temperature data at preset time intervals t, and transmit the temperature data to a data processing terminal.

Step 6: After receiving the temperature data, the data processing terminal averages the temperature data acquired by each wireless thermocouple over each preset time interval t, to obtain m pieces of average temperature data.

Step 7: The data processing terminal combines the obtained m pieces of average temperature data into a 1×m matrix and adds distance data $D_1$ and $D_2$ to the matrix, resulting in a 1×(m+2) matrix.

Step 8: Input the 1×(m+2) matrix obtained in step 7 into a trained prediction program integrating an MLP and a KNN algorithm, and obtain a predicted location block of the fire source through backpropagation and category voting.

Embodiment: (1) A fire room model was constructed based on real room dimensions. The model had a height of 2.8 m, a length and width of 5 m each; a window started at 1 m above the floor, with a width of 1.8 m and a height of 1.5 m, kept closed during the fire. A door, with a width of 0.8 m and a height of 2 m, was placed opposite the window and kept open during the fire. The floor was tiled, and the walls were made of concrete. Combustible materials had a foam upper surface with a thickness of 0.05 m, and the remaining surfaces and interiors were made of yellow pine. Combustibles were placed at nine different positions in the room. For each experiment, the fire source was set as a "vent" on an upper surface of a single combustible, with a maximum heat release rate of each fire source ranging from 300 to 400 kW. A simulation duration was 600 s, and multiple experiments were conducted with varying window positions to obtain sufficient data.

(2) From the acquired data, 3,000 sets of data were randomly selected as a training dataset, with 80% used as a training set and 20% used as a test set.

Figure 3:
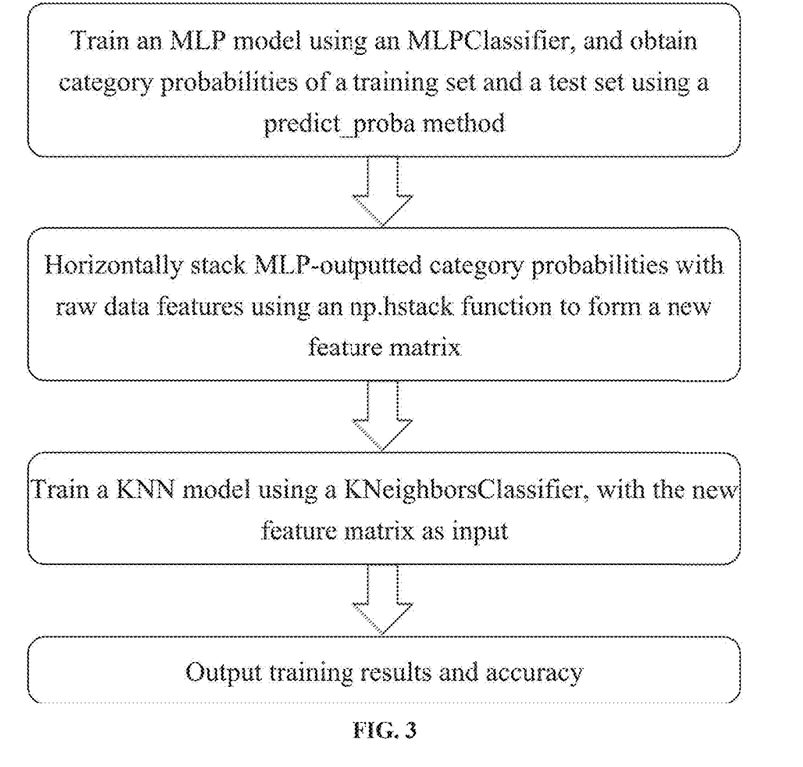
FIG. 3 is a workflow diagram of a prediction program integrating an MLP and a KNN algorithm according to the present disclosure.

(3) As shown in FIG. 3, an MLPClassifier instance was created with a hidden layer structure of 64 neurons in the first layer and 32 neurons in the second layer, using ReLU as an activation function and a maximum of 1,000 iterations. The MLP model was trained on the training set via forward propagation and backpropagation algorithms to adjust weights and biases, thereby minimizing a prediction error (typically a cross-entropy loss).

(4) After training, the MLP model was employed to perform forward propagation on both training and test sets to extract hidden layer outputs (feature representations).

(5) The hidden layers of the MLP transformed input data into intermediate representations, which were used for feature extraction. The hidden layer outputs were regarded as a new feature set, used for the subsequent KNN classifier. The purpose of feature extraction was to convert data into abstract representations learned by the MLP.

(6) A KNeighborsClassifier instance was created, with cross-validation and k values of [1, 3, 5, 7, 9, 11]. The KNN classifier was trained using features extracted from the MLP model. A training phase of the KNN algorithm does not require a learning process but stores training data.

(7) The KNN classifier was used to predict test data: The KNN algorithm identifies k-nearest neighbors based on distance metrics, then determines the predicted category through majority voting. For each test sample, a Euclidean distance between the test sample and all samples in the training set was calculated as follows:

$$\sqrt{\sum_{i=1}^{n}(x_i - y_i)^2}$$

The training samples were sorted in ascending order of calculated distances, and k training samples closest to the test sample were selected.

(8) Voting was performed on category labels of the selected k neighbors. The category label of each neighbor contributes one vote. For instance, if 3 neighbors belonged to category 1 and 2 neighbors belonged to category 3, the test sample was classified as category 1. The final predicted category of the test sample was determined by tallying the votes for each category label and selecting the category with the highest number of votes:

$$\hat{y} = \mathrm{argmax}_c \left( \sum_{i=1}^{k} \prod (y_i = c) \right);$$

Obtained experimental data is shown in the table below:

| Group | Actual result | Predicted result |
| --- | --- | --- |
| 1 | 7 | 7 |
| 2 | 7 | 7 |
| 3 | 7 | 7 |
| 4 | 2 | 2 |
| 5 | 7 | 7 |
| 6 | 7 | 7 |
| 7 | 5 | 5 |
| 8 | 2 | 2 |
| 9 | 5 | 5 |
| 10 | 2 | 2 |
| 11 | 5 | 5 |
| 12 | 9 | 9 |
| 13 | 2 | 2 |
| 14 | 9 | 9 |
| 15 | 1 | 1 |
| 16 | 9 | 9 |
| 17 | 9 | 9 |
| 18 | 2 | 2 |
| 19 | 1 | 1 |
| 20 | 5 | 5 |
| 21 | 1 | 1 |
| 22 | 5 | 5 |
| 23 | 3 | 3 |
| 24 | 1 | 1 |
| 25 | 5 | 5 |
| 26 | 3 | 3 |
| 27 | 1 | 1 |
| 28 | 3 | 3 |
| 29 | 3 | 3 |
| 30 | 1 | 1 |
| 31 | 8 | 8 |
| 32 | 3 | 3 |
| 33 | 8 | 8 |
| 34 | 3 | 3 |
| 35 | 8 | 8 |
| 36 | 8 | 8 |
| 37 | 4 | 4 |
| 38 | 4 | 4 |
| 39 | 4 | 4 |
| 40 | 4 | 4 |
| 41 | 6 | 6 |
| 42 | 4 | 4 |
| 43 | 6 | 6 |
| 44 | 6 | 4 |
| 45 | 4 | 4 |
| 46 | 6 | 6 |
| 47 | 6 | 6 |
| 48 | 6 | 6 |

From the above embodiments, the following conclusions are obtained: When the fire source is located on one side of the glass, the temperatures of the wireless thermocouples along the upper horizontal line of the glass consistently exhibit a decreasing trend from the fire side to the non-fire side. When the fire source is positioned along the central vertical line of the glass surface, the temperatures along the upper horizontal line of the glass do not show any increasing or decreasing pattern. This temperature variation trend can serve as the basis for determining the lateral position of the fire source.

Under the combined effects of smoke and thermal radiation, when the fire source is far from the glass, the influence of smoke on the glass temperature is more significant. When the fire source is close to the glass, the effects of thermal radiation and fire plumes on the glass temperature become more dominant. When the fire source is far from the glass, the temperature difference between thermocouple at the highest horizontal line and thermocouple at the central horizontal is smaller than the temperature difference between thermocouple at the central horizontal line and thermocouple at the lowest horizontal line. The opposite is true when the fire source is close to the glass. When the fire source is located on the central plane of the room perpendicular to the glass, the two temperature differences are approximately equal. This characteristic can serve as the basis for determining the longitudinal position of the fire source.

Figure 4:
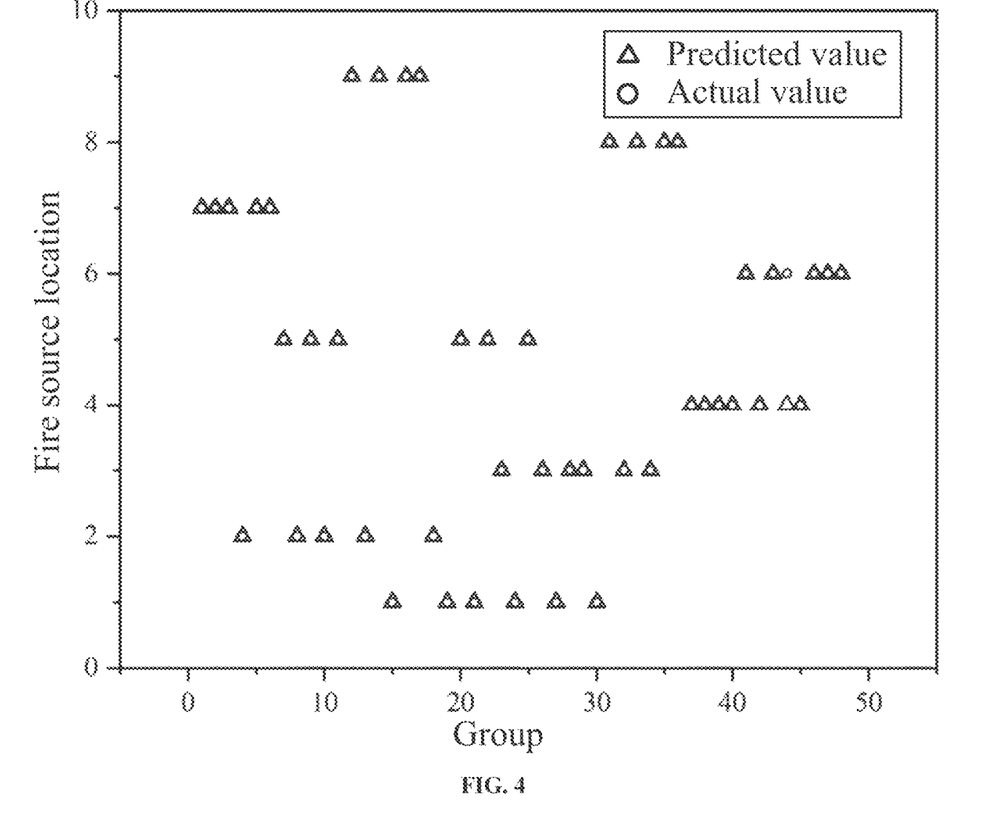
FIG. 4 is a diagram illustrating comparison between predicted results and actual results according to an embodiment of the present disclosure.

As shown in the experimental data table and FIG. 4, the present disclosure demonstrates high accuracy even with a small training dataset and exhibits strong universality, achieving high accuracy across different building structures. The present disclosure is suitable for firefighting and rescue operations in high-rise buildings, enabling immediate deployment and use. Compared to other fire source localization methods, the present disclosure offers superior universality, timeliness, and efficiency while maintaining a high level of accuracy.

What is claimed is:

1. An indoor fire source localization method for high-rise buildings based on glass surface temperature, comprising the following steps:
   step 1: arranging an array of m wireless thermocouples on an outer surface of glass in a fire room, with the array distributed on a largest piece of glass in the fire room, wherein each wireless thermocouple is connected to a temperature data signal acquisition module;
   step 2: measuring horizontal distances from a centrally positioned wireless thermocouple in the arranged array to two side walls of the fire room, denoted as $D_1$ and $D_2$;
   step 3: dividing the fire room into r blocks of an equal area, wherein the quantity of blocks is the same as the quantity of wireless thermocouples, and the blocks are arranged in an array, assigning numbers to the blocks, and using the numbers of the blocks as program-output fire source location categories;
   step 4: adjusting the temperature data signal acquisition module to receive temperature data signals from each wireless thermocouple at a frequency q;
   step 5: activating a fire source in the fire room and the temperature data signal acquisition module, acquiring and reading temperature data from each wireless thermocouple in real time, saving the acquired temperature data at preset time intervals t, and transmitting the temperature data to a data processing terminal;
   step 6: after receiving the temperature data, averaging, by the data processing terminal, the temperature data acquired by each wireless thermocouple over each preset time interval t, to obtain m pieces of average temperature data;
   step 7: combining, by the data processing terminal, the obtained m pieces of average temperature data into a 1×m matrix and adding distance data $D_1$ and $D_2$ to the matrix, resulting in a 1×(m+2) matrix;
   step 8: inputting the 1×(m+2) matrix obtained in step 7 into a trained prediction program integrating a multi-layer perceptron (MLP) and a k-nearest neighbors (KNN) algorithm, and obtaining a predicted location block of the fire source through backpropagation and category voting.

2. The indoor fire source localization method for high-rise buildings based on glass surface temperature according to claim 1, wherein the temperature data in step 6 is obtained specifically according to the following steps of:
(1) receiving, by the data processing terminal, the temperature data, and obtaining a matrix as follows:

$$\begin{pmatrix} T_{11}, T_{12}, T_{13} \ldots T_{1(tq)} \\ T_{21}, T_{22}, T_{23} \ldots T_{2(tq)} \\ \ldots\ldots \\ T_{m1}, T_{m2}, T_{m3} \ldots T_{m(tq)} \end{pmatrix};$$

wherein $T_{m(tq)}$ represents a tq-th data acquired by an m-th wireless thermocouple within the time interval t; and a total of tq pieces of temperature data are acquired from a single wireless thermocouple within the time interval t; and
(2) calculating an average value of each row of temperature data in the matrix from step (1) to form a row matrix:
$\lfloor T_1=(T_{11}+T_{12}+ \ldots T_{1(tq)})/tq, T_2=(T_{21}+T_{22}+ \ldots T_{2(tq)})/tq, \ldots, T_m=T_{11}+T_{12}+ \ldots T_{1(tq)}/tq \rfloor$
wherein $T_m$ is an average temperature data value of the m-th wireless thermocouple within the time interval t.

3. The indoor fire source localization method for high-rise buildings based on glass surface temperature according to claim 2, wherein a specific process of step 7 is as follows: adding $D_1$ and $D_2$ to the row matrix obtained in step 6 to form a new matrix:
$[T_1, T_2, T_3, \ldots T_m, D_1, D_2]$.

4. The indoor fire source localization method for high-rise buildings based on glass surface temperature according to claim 3, wherein a training process of the prediction program integrating the MLP and KNN algorithm in step 8 is as follows:
(1) simulating fire data using fire simulation software, and constructing a fire dataset, with a specific process as follows:
a, establishing a fire combustion model, and setting parameters comprising room geometry, fire source location, fire source heat release rate, and fire source area;
b, arranging m temperature measurement points in an equally spaced square array on fire room glass, recording temperature at each temperature measurement point, and noting distances $D_1$ and $D_2$ from the central wireless thermocouple to two side walls;
c, setting a simulation time to obtain a post-simulation measurement point temperature dataset $\{T_{mt}\}$, wherein $T_{mt}$ represents temperature data of an m-th measurement point at a t-th second;
d, packaging temperature measurement point data into a dataset, wherein a vertical dimension represents different times, and a horizontal dimension represents temperature parameters and distance parameters of different wireless thermocouples:

$$\begin{Bmatrix} T_{11}, T_{21}, \ldots, T_{m1}, D_1, D_2 \\ T_{12}, T_{22}, \ldots, T_{m2} \\ \ldots\ldots \\ T_{1t}, T_{2t}, T_{m3}, \ldots, T_{mt} \end{Bmatrix};$$

(2) dividing the dataset into a training set and a test set using train_test_split;
(3) creating an MLP model, configuring a structure of each hidden layer, and setting an activation function ReLU and a maximum number of iterations, wherein a specific process is as follows: setting input feature dimensionality based on experimental data parameters, that is, the quantity of temperature measurement points and the quantity of distance parameters; configuring the structure of each hidden layer based on the input feature dimensionality, and setting the activation function ReLU and the maximum number of iterations;
(4) calling a fit method to train the MLP model, optimizing weights and biases of a network to minimize a loss function, with steps as follows:
a, inputting a training dataset and initializing parameters, comprising weights and biases;
b, passing input data to each neuron in an input layer;
c, in the hidden layer, multiplying the input data by a weight matrix of the current layer and adding a bias term;
d, applying the activation function ReLU to a weighted sum for nonlinear transformation to obtain an output of the hidden layer:

$H=\sigma(XW_h+b_h)$ $\hat{p}=\text{soft max}(XW_h+b_h)$ wherein H represents the hidden layer, σ represents the activation function, X represents the input layer, $W_h$ represents the weight, $b_h$ represents the bias term, $\hat{p}$ represents an MLP probability result, and a softmax function is used to convert the output into a probability distribution;
e, in an output layer, multiplying an output of a last hidden layer by a weight matrix of the output layer and adding a bias term;
f, computing a final predicted output using the Softmax function;
g, calculating an error (loss value) between model-predicted values and actual labels;
h, computing gradients of the loss function with respect to the weights and biases using a chain rule;
I, updating the parameters of the network using the computed gradients;
j, inputting a validation dataset to obtain a loss value;
k, repeating steps b to j until the loss value of the validation dataset no longer decreases or a preset number of training iterations is reached;
(5) reading output probabilities of the MLP model using a predict_proba method, wherein the output probabilities represent predicted probabilities for each fire source location category;
(6) creating a KNN classifier and setting the quantity of neighbors k;
(7) training the KNN classifier using features extracted from the MLP model;
(8) calling the fit method to train a KNN model, specifically comprising storing training data and training labels;
(9) predicting test data using a predict method, with steps as follows:
a, for each input test sample, computing a Euclidean distance of the test sample to all training samples:

$$\sqrt{\sum_{i=1}^{n}(x_i - y_i)^2}$$

wherein n represents dimensionality; xi represents a training sample, and $y_i$ represents a test sample;

b, selecting k nearest training samples based on the distances obtained in step a;

c, performing voting or weighted voting on labels of the selected k neighbors to determine a final predicted fire source location category for the test sample:

$$\hat{y} = \mathrm{argmax}_c \left( \sum_{i=1}^{r} \prod (y_i = c) \right)$$

wherein ŷ represents a predicted result; $\Pi(y_i=c)$ is an indicator function that equals 1 if a category $y_i$ of an i-th neighbor is c; otherwise, the indicator function equals 0;

(10) computing classification accuracy using a classification_report function, with a formula as follows:

$$\mathrm{Accuracy} = \frac{n_{correct}}{n_{total}}$$

wherein Accuracy represents accuracy; $n_{correct}$ represents the quantity of correctly predicted test sets, and $n_{total}$ represents a total quantity of test sets;

(11) incrementally increasing a k value of the KNN classifier until the accuracy no longer improves; and (12) completing the training and saving all parameters of the MLP model and the KNN model.

5. The indoor fire source localization method for high-rise buildings based on glass surface temperature according to claim 1, wherein the preset time interval t ranges from 10 to 60 seconds, and the frequency q is 1 Hz or higher.

* * * * *